United States Patent [19]

Allen

[11] Patent Number: 4,865,237

[45] Date of Patent: Sep. 12, 1989

[54] CARRIER FOR A BEVERAGE CONTAINER

[76] Inventor: Louis Allen, 166 E. 61 St., New York, N.Y. 10021

[21] Appl. No.: 283,085

[22] Filed: Dec. 12, 1988

[51] Int. Cl.$^4$ .............................................. A47K 1/05
[52] U.S. Cl. ........................... 224/42.45 R; 248/311.2; 211/88; 224/278; 224/42.42
[58] Field of Search ................... 248/311.2, 312.1, 310; 215/100 R; 220/85 H, 903; 211/88, 89; 224/42.45 R, 42.46 R, 42.42, 278

[56] References Cited

U.S. PATENT DOCUMENTS

| | | | |
|---|---|---|---|
| 2,289,701 | 7/1942 | Engel et al. | 248/311.2 |
| 2,628,054 | 2/1953 | Fazokerley | 248/311.2 |
| 3,314,635 | 4/1967 | Frye | 248/311.2 |
| 3,707,272 | 12/1972 | Rasmussen | 248/311.2 |
| 3,807,674 | 4/1974 | Justen | 248/311.2 |
| 3,843,082 | 10/1974 | Garrett | 248/311.2 X |
| 4,256,281 | 3/1981 | Harris et al. | 248/231 |
| 4,560,128 | 12/1985 | Willeby et al. | 248/311.2 X |
| 4,629,153 | 12/1986 | Marcum | 224/42.45 R |
| 4,634,089 | 1/1987 | Wright et al. | 248/311.2 |
| 4,655,425 | 4/1987 | Wallace et al. | 248/311.2 |
| 4,678,154 | 7/1987 | McFarland | 248/311.2 |
| 4,727,890 | 3/1988 | Vincent | 131/329 |
| 4,749,112 | 6/1988 | Harper | 224/42.45 R |
| 4,765,581 | 8/1988 | Wallace et al. | 248/311.2 |
| 4,767,092 | 8/1988 | Weatherly | 248/311.2 |

FOREIGN PATENT DOCUMENTS 107302 6/1923 Switzerland ................. 248/311.2

Primary Examiner—Ernest G. Cusick

[57] ABSTRACT

A carrier for adjustably encircling and simultaneously positioning, a beverage container or article on a vehicle door, includes an insert portion and a support portion, both preferably resilient, and a receptacle. The insert portion, functioning in conjunction with the support portion, provides for removable, adjustable, and preferably clampable carrier mountability on vehicle doors of different interior thicknesses. The support portion is preferably equipped with horizontally and longitudinally aligned slots and the receptacle is equipped with a pair of resilient, container-encircling arms and a base member, all having hooked tab ends for cooperative releasable, adjustable spring-urged interconnection with the slots. Selection of particular slots for interconnection allows the carrier to accommodate beverage containers or articles of different diameters in close confinement and upright position. In a varient embodiment, a coin-tray-article container is substituted for a beverage container receptacle.

21 Claims, 2 Drawing Sheets

FIG. 1
FIG. 2
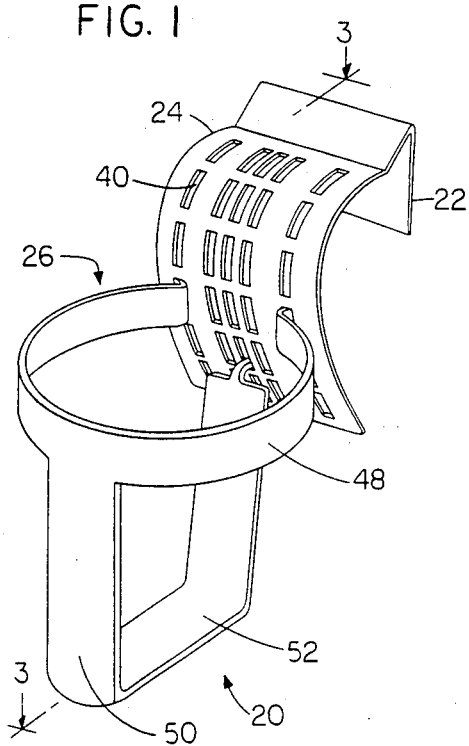
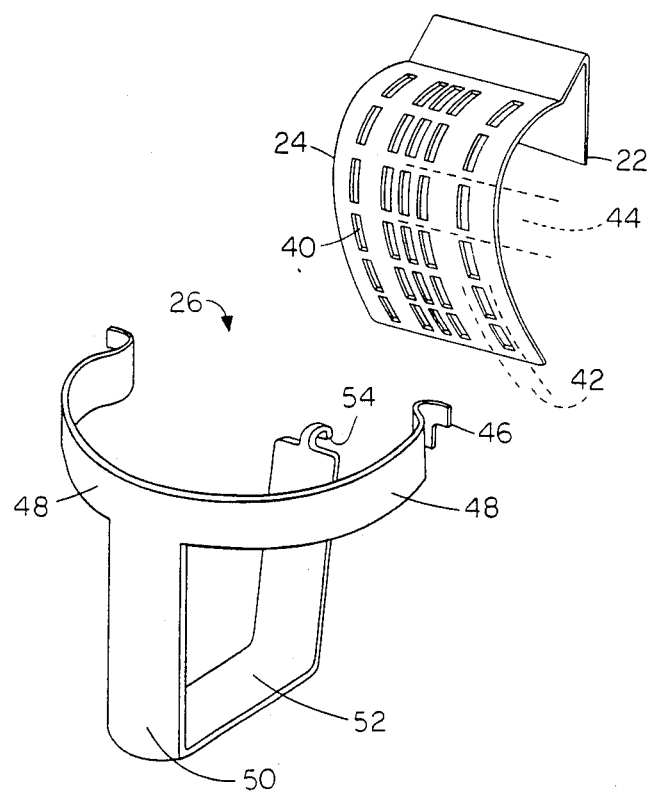
FIG. 3
FIG. 3A
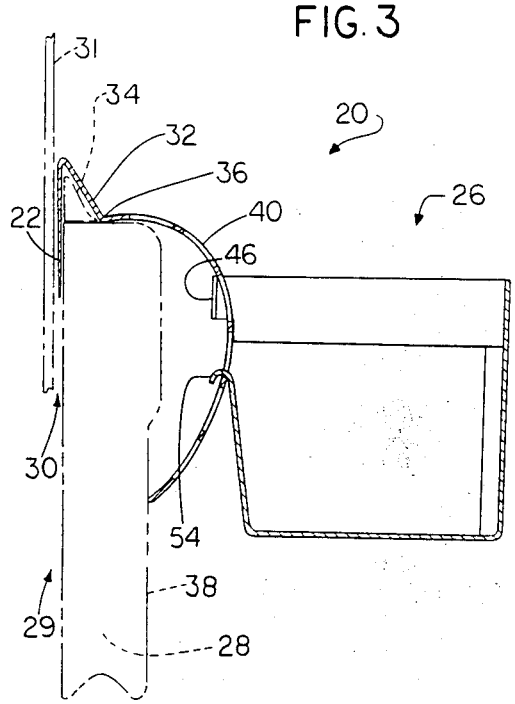
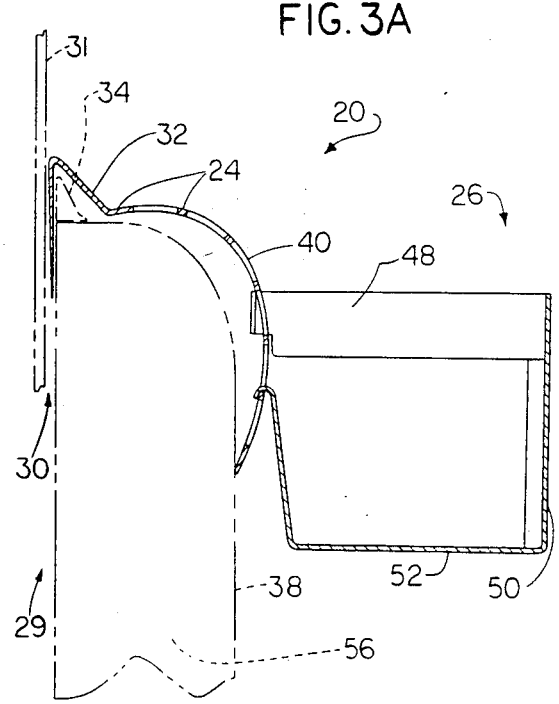

CARRIER FOR A BEVERAGE CONTAINER

FIELD OF THE INVENTION

This invention relates generally to article-holding devices and especially to a carrier for a beverage container or the like.

In particular, the carrier of this invention concerns an auxiliary support attachable to the interior of a vehicle.

BACKGROUND OF THE INVENTION

The prior art is profuse on the subject of cupholders for vehicles. In the advancement of the art, the overriding problem of beverage stability in a moving environment has been addressed in a variety of ways and with a variety of devices, having progressed to door-securable types, adjustable as to interior door thickness accommodation, container-confinement diameters and upright holder positioning.

For example, the device of U.S. Pat. No. 4,767,092 used deployment of one or more arm-stiffeners and rather complexly constructed container-confinement means. The device of U.S. Pat. No. 4,727,890 did not deal with diameter adjustability. U.S. Pat. No. 4,655,425 used a resilient pusher element to counter shake, rattle and roll. The device of U.S. Pat. No. 4,634,089 required an adhesively-attached fixture to the vehicle interior.

Still absent has been a simple, releasably attachable device, now provided by the instant invention, which device may be clampingly securable to vehicle doors of different interior thicknesses and provide a singly adaptable means for both selective diameter adjustability and selectively adjustable vertical positioning of a container-confining holder.

SUMMARY OF THE INVENTION

Briefly, the device of this invention generally concerns a carrier for a beverage container for attachment to a vehicle door.

The carrier includes an insert portion, a support portion for a container-holder and a holder.

A feature of the invention is in the provision of a simply designed support means providing both selective adjustability of the holder diameter for container confinement and selectively adjustable vertical positioning of the holder.

The invention also encompasses a carrier that is releasably clampingly attachable to a vehicle door providing taut engagement for enhanced carrier stability.

Although the invention visualizes the use of a resilient plastic material for the various embodiments, it should be noted that other materials or combinations of materials may be used, including resiliently deformable sheet metal as shown in a particular embodiment.

The invention also provides for the accommodation of door interiors ranging in thickness.

Having thus summarized the invention, it will be seen that it is an object of this invention to provide a carrier for a beverage container of the general character described herein, which contains novel features and is not subject to the aforementioned deficiencies.

Specifically, it is an object of this invention to provide a carrier for a beverage container for releasable securement to a vehicle door.

Another object of the invention is to provide a carrier for a beverage container that has a selectively diameter-adjustable holder for closely conforming container confinement.

Another object of the invention is to provide a carrier for a beverage container wherein the holder is vertically selectively adjustably positionable.

Still another object of this invention is to provide a carrier for a beverage container that is adaptable for accommodating vehicle doors of ranging interior thicknesses.

A further object of this invention is to provide a carrier for a beverage container that is clampingly attachable to a vehicle door for enhancing carrier stability.

A still further object of this invention is to provide a carrier for a beverage container which is simple in construction, low in cost, reliable in use and well adapted for mass production and fabrication techniques.

Other objects in part will become apparent and in part pointed out hereinafter.

With these ends in view, the invention finds embodiments in certain combinations of elements and arrangements of parts which the aforementioned objects and certain other objects are hereinafter attained, all as fully described with reference to the accompanying drawings and the scope of which is more particularly pointed out and indicated in the appended claims.

DESCRIPTION OF THE DRAWINGS

FIG. 1 is a perspective view showing a carrier for a beverage container in accordance with the invention.

FIG. 2 is an exploded perspective view of FIG. 1.

FIG. 3 is a sectional view along line 3—3 of FIG. 1 of the carrier mounted on a vehicle door, showing an insert portion engaged within a window slot opening, an inverted V-shaped portion circumscribing interior weatherstripping, a support portion including interconnected slots and tabs supporting a holder in an upright position.

FIG. 3A is an auxiliary sectional view along line 3—3 of FIG. 1 showing the carrier of FIG. 3 with the support portion displaced accommodating a thicker door interior in clamping relationship and the relocation of the holder uprightly positioned in a lower tier of slots.

DETAILED DESCRIPTION OF THE PREFERRED EMBODIMENTS

Figure 4:
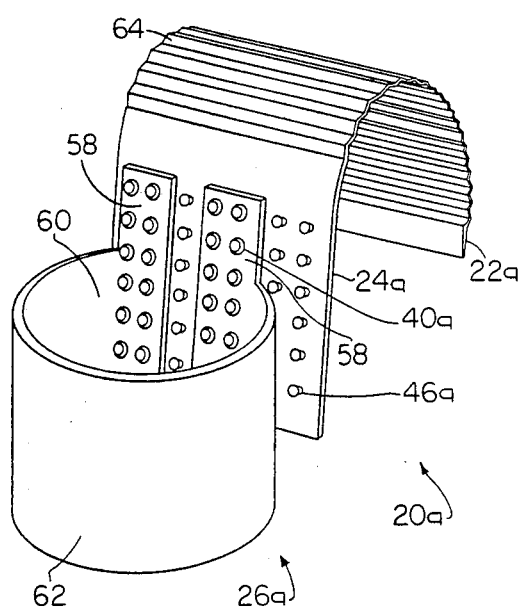
FIG. 4 is a perspective view of an alternate embodiment of the carrier of the invention showing a selectively horizontally and vertically attachable recessed holder snap-interfittingly engaged with the support portion.

Referring now in detail to the invention, the reference numeral 20 denotes generally a carrier for a beverage container in accordance with the invention.

The carrier 20 as shown in FIGS. 1 and 2 is comprised of an insert portion 22, a support portion 24 for a holder and a container-confining holder 26.

The carrier 20 may be fabricated of plastic, sheet metal, wire, cardboard or other resilient, deformable or supple materials or in hybrid constructions of combinations of such materials in accordance with the invention.

As can be seen in FIGS. 3 and 3A, the carrier 20 is designed to be mounted to the interior portion 28, 56 of a vehicle door 29, the insert portion 22 extending downwardly in wedging frictional contact within the window slot opening 30 between the window 31 and/or contiguous weatherstripping 34. An inverted V-shaped portion 32 is atypically high-rising, intended for providing clearance for unskewed mounting over the high-rise weatherstripping 34, increasingly employed in newer vehicle models. Further, the inverted V-shaped portion 32 also provides for enhanced frictional engagement within the window slot opening 30.

Referring still to FIGS. 3 and 3A, the generally curvilinearly resilient support portion 24 extends outwardly from the base 36 of the inverted V-shaped portion 32, thence curvingly turning in a downwardly-inwardly biased direction terminating in spring-urged contact with the door interior panel 38. Said spring-urged contact, being in opposition to the said wedgingly-engaged insert portion 22, provides for clamping engagement of the carrier 20 to the thinner and thicker interior door portions 28, 56.

As can be seen in FIGS. 1 and 2, the support portion 24 includes slots 40 aligned in longitudinal columns 42 and in horizontally aligned rows 44, providing interconnection means for selectively releasably adjustable engagement with cooperative connecting means in the form of tab ends 46 of the holder 26.

The holder 26 consists of a pair of generally horizontally-disposed resiliently curvilinear arm members 48 having out-turned tab ends 46 providing said cooperative connecting means, a downwardly depending spine member 50 and an L-shaped base member 52 with a downwardly hooked tab end 54 providing a further cooperating connecting means for added carrier 20 stability.

As can be seen in FIGS. 1 and 2, the resilient arm members 48 may be pinched inwardly to selectively dimension the holder diameter, so that the tab ends 46 may be inserted into the appropriately cooperative slots 40 in outwardly spring-urged engagement with said slots 40 thus securing the holder 26 to the support portion 24. The tab end 54 of the base member 52 is also hook-engaged to the appropriate slot 40. It should be recognized that the resilient arm members 48 may be alternatively fabricated narrowly so as in use to be resiliently urgeable outwardly, instead of pinched inwardly, whereby the tab ends 46 would be inwardly-turned and said spring-urging would be inwardly biased effecting a clamping engagement with the slots 40.

It should thus be seen in FIGS. 1 and 2 that the embodiment provides for removably selective diameter adjustability and, as seen in FIGS. 3 and 3A, selectively removably adjustable vertical positioning of the holder 26. It should also be noted that the selectively vertical positioning adjustability function is not dependent on whether the embodiment is clamping or non-clamping in attachment to the interior door portion 28, 56, the invention encompassing either attachment means.

The number, size, shape and location of the slots 40 may vary and, as will be seen in another embodiment, variations in the interconnective means may also be employed instead of slots 40 and slot-cooperative tab ends 46 and hooks 54.

FIGS. 3 and 3A demonstrate the carrier 20 in functioning positions in clamping attachment to the interior door portions 28, 56 wherein the carrier 20 resiliently accommodates interior door portions 28, 56 of two different thicknesses. As can be observed in the instance of the narrower interior portion 28, slots 40 on one tier or row are engaged, whereas a lower tier or row of slots 40 are engaged on the thicker interior door portion 56, in both instances, positioning the holder 26 in an upright position.

Further, one or more top rows 44 of slots 40 provide an ancillary use in allowing unobstructed air passage through louvers forwardly located on doors of many newer vehicles, where a carrier is advantageously mounted, as will hereinafter be explained.

In a modified embodiment shown in FIG. 4 wherein like numerals of the previous embodiment have been used for representing corresponding parts with the suffix "a", a carrier 20a includes an insert portion 22a, a support portion 24a and a holder 26a, which carrier 20a functions similarly as and may be of the same materials of the previous embodiment, except for the type of interconnection-engagement means employed between the support portion 24a and the holder 26a and in that this embodiment need not necessarily be clampingly engageable with an interior door portion 28 (shown in FIG. 3) and in certain other aspects may be particular to the instant embodiment as will be explained.

The interconnection-engagement means between the holder 26a and the support means 24a includes bulbous male pins 46a and female perforations 40a providing snap-interfitting means well known in the art for horizontal and vertical positioning functioning similarly as the slots 40 and the connecting tabs 46 and hook 54 of the previous embodiment.

The holder 26a is a generally cylindrically walled recess 60, which is sectioned along a longitudinal plane into two sections 58 resiliently hinged on the wall 62 of the recess 60. Reference to the embodiment of FIG. 6, which is similar in this sectionally hinged aspect, shows how the sections 58 of the instant embodiment are similarly transversely displaceable providing for selective diameter adjustability of the holder 26a.

The support portion 24a and insert portion 22a in part coextensively form a crimped portion 64 allowing the support portion 24a to function as necessary as an insert means. The thickness of the interior door portion 28 to be accommodated will determine to what depth the crimped portion 64 will be inserted into the window slot opening 30 (shown in FIG. 3).

Figure 5:
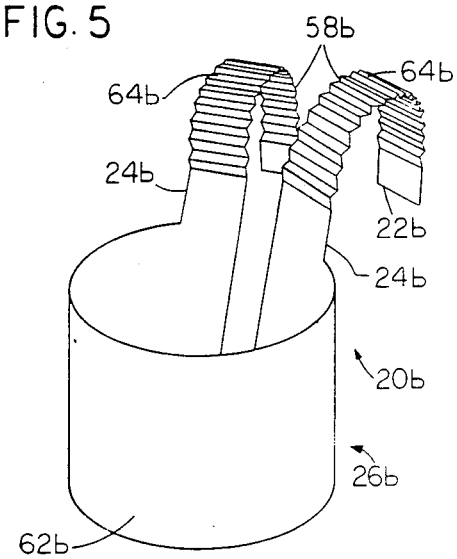
FIG. 5 is a perspective view of another alternate embodiment of the carrier of the invention showing a horizontally diameter-adjustable two-sectioned longitudinally integrated holder.

At this point it should be observed, better to explain aspects of this embodiment and, incidentally, the embodiment of FIG. 5, that a preferred mounting location of a carrier generally is on the forward portion of a front door interior, where vent windows heretofore were prevalent and are now increasingly less so, and where a user's arm or shoulder will not accidentally dislodge the carrier. However, in this forward location, typically, there is no window mechanism, nor, as such windows are not squared, is there sufficient window surface present for frictional engagement when the window is partially or fully retracted. In such circumstances, it redounds almost entirely to the weatherstripping for engagement of a carrier.

Accordingly, the instant embodiment advantageously frictionally engages the weatherstripping 34 at the forward portion of the window slot opening 30 selectively employing, deeply or shallowly, the crimped portion 64 as the insert means for accommodating doors of ranging interior thicknesses.

Figure 6:
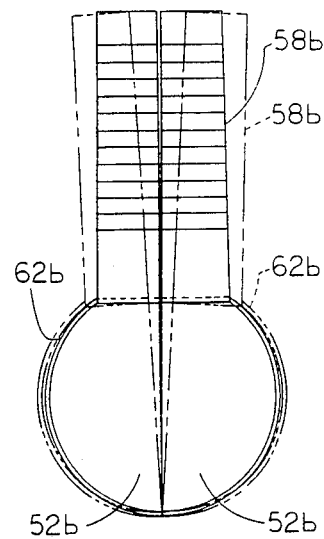
FIG. 6 is a top view of FIG. 5 showing the horizontally diameter-adjustable feature.

Another variant form of the invention is shown in FIGS. 5 and 6, wherein like numerals have been used to represent similar elements of the previous embodiments with the addition of the suffix "b".

The insert portion 22b, the support portion 24b, the recess wall 62b and the base 52b of this embodiment are sectioned along a longitudinal plane forming two longitudinally associated sections 58b hinged on the recess wall 62b as described in the previous embodiment allowing transverse displacement of the sections 58b including in this embodiment the insert portions 22b, the support portions 24b, the recess wall 62b and the base 52b.

Accordingly, the insert portions 22b can be flexibly, adjustably and selectively positioned in wedged frictional engagement within the window slot opening 30 to effect a desired diameter setting and vertical disposition of the holder 26b.

Particularly visualized, though not meant to be a restriction for this embodiment, is a paper-thin disposable or quasi-disposable plastic carrier 20b possibly suitable for sales-incentive purposes.

It should be seen that the carrier 20b may be fabricated having a longitudinally perforated seam (not shown) allowing the carrier 20b to be separated along the seam into two sections to function as hereinbefore described. FIG. 6 also illustrates the carrier 20b as it would function after separation of the perforation.

Figure 7:
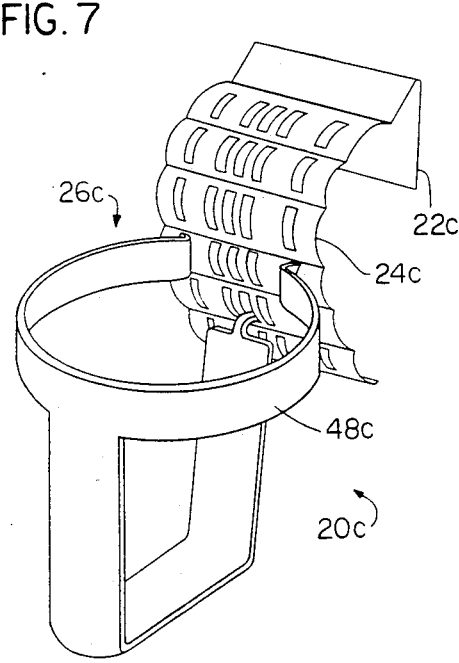
FIG. 7 is another embodiment of the invention in perspective view illustrating a corrugated resiliently reformable support portion.

In another modified embodiment shown in FIG. 7, wherein like numerals of the previous embodiments have been used for representing corresponding parts with the addition of the suffix "c", a resiliently deformable insert portion 22c and a resiliently deformable corrugated support portion 24c are fabricated of sheet metal for allowing radical deformation of the support portion for conformation to particular interior door portions 28 of different thicknesses, the corrugation providing for transverse rigidity, longitudinal displaceability and general shape restorability of the support portion 24c.

It should be observed that the resiliently deformable metal allows clamping or non-clamping releasable securement to a vehicle door 29. In other aspects, the instant embodiment is similar to the embodiments previously described.

Figure 8:
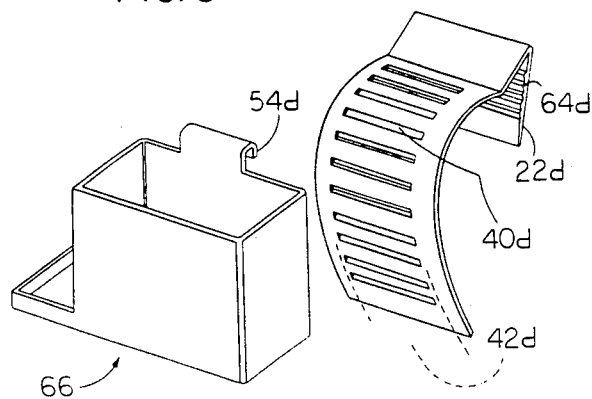
FIG. 8 is another embodiment of the invention in a exploded perspective view showing a coin-tray-article holder with a hooked cooperative connecting portion and a support portion including one longitudinal column of interconnection slots.

Still another modified embodiment is shown in FIG. 8, wherein like numerals have been used to represent similar elements of the previous embodiments with the addition of the suffix "d".

The embodiment is similar in function and construction with previously described embodiments except that a coin-tray-article holder 66 has been substituted for a beverage container holder 26 and the slots 40d are disposed in one longitudinal column 42d and the connecting means of the holder 66 is in the form of a single downwardly hooked portion 54d.

The insert portion 22d has a partially crimped portion 64d for frictional intervention into a window slot opening 30 functioning similarly as in previous embodiments.

It should be observed that means other than the aforementioned crimping means may be employed alternatively, such as fluting, ribbing, pebbling or other non-smooth surface means for enhancing frictional engagement within a window slot opening.

It should thus be seen that the beverage carrier of this invention provides an improved and efficient device for detachable securement to a vehicle door and that it is well adapted to meet the conditions of practical use. Since various possible embodiments may be made of the present invention and further changes may be made in exemplary embodiments set forth herein, it is to be understood that all materials set forth and shown in the accompanying drawings are to be interpreted as illustrative and not in a limiting sense.

Having thus described the invention, there is claimed as new and desired to be secured by Letters Patent:

1. A carrier for a beverage container adapted for mounting on a vehicle door having a window slot opening, said carrier comprising an insert means adapted for frictional intervention within the window slot opening for releasable securement to the door, a support means for a holder means and a holder means for a beverage container, the support means having at least one row of horizontally disposed interconnection means for securement of said holder means, said holder means having removable adjustable connecting means for cooperative engagement with the interconnection means providing for selective diameter adjustability of said holder means.

2. The carrier according to claim 1 wherein the support means includes longitudinally aligned interconnection means for removable engagement with said holder connecting means.

3. The carrier according to claim 2 wherein the support means extends in a curvilinearly outward direction from the insert means then in a generally inwardly-downwardly direction towards the door whereby said at least one row of horizontally disposed and longitudinally aligned interconnection means and said connecting means are selectively adjustably engageable for upright positioning of the holder means.

4. The carrier according to claim 1 wherein the insert means and the support means are in spring-urged opposition to each other providing a means for clamping adapted for attachment to the door.

5. The carrier according to claim 4 wherein the means for clamping attachment includes a resiliently deformable metal material.

6. The carrier according to claim 1 wherein the holder means comprises a pair of resiliently curvilinearly horizontally-disposed arm members, a downwardly depending spine member and a base member.

7. The carrier according to claim 6 wherein the base member is L-shaped.

8. The carrier according to claim 1 wherein the at least one row of horizontally disposed interconnection means include at least one slot means.

9. The carrier according to claim 1 wherein the insert means includes an inverted V-shaped portion adapted for enhanced frictional engagement within the window slot opening.

10. The carrier according to claim 1 wherein the support means is fabricated of a resilient material.

11. The carrier according to claim 1 wherein the support means is fabricated of a deformable material.

12. The carrier according to claim 1 wherein the support means is fabricated of a supple material.

13. The carrier according to claim 1 wherein the insert means includes a non-smooth portion adapted for enhanced frictional engagement within the window slot opening.

14. The carrier according to claim 1 wherein the at least one row of horizontally disposed interconnection means and connecting means include male-female snap-interfitting means.

15. The carrier according to claim 1 wherein the support means is transversely corrugated.

16. The carrier according to claim 1 wherein the connecting means are spring-urged within the at least one row of horizontally disposed interconnection means for taut securement.

17. A carrier for a beverage container adapted for attachment to a vehicle door having a window slot opening, said carrier comprising an insert means adapted for wedging engagement within the window slot opening, a support means for a holder means and a holder means for a beverage container, the support means extending in a generally curvilinearly outwardly direction from the insert means then downwardly and inwardly in spring-urged opposition to said insert means providing for clamping securement to the door, said support means including at least one longitudinal column of interconnection means for engagement with the holder means said at least one longitudinal column of interconnection means having a dimension with a transverse axis substantially greater than the vertical axis, said holder means having adjustable connecting means for cooperative securement with the at least one longitudinal column of interconnection means providing for selective adjustable upright positioning of said holder means.

18. The carrier according to claim 17 wherein the support means includes horizontally aligned interconnection means providing for removably selective diameter adjustability of the holder means.

19. The carrier according to claim 17 wherein the holder means defines a generally cylindrically-walled recess with a recess wall which recess is sectioned along a longitudinal plane into two sections resiliently hinged on said recess wall allowing transverse displacement of said sections providing for selective diameter adjustability of the holder means.

20. A carrier for an article adapted for mounting on a vehicle door having a peripherally weatherstripped window slot opening, said carrier comprising an insert means adapted for frictional intervention within the window slot opening for removable securement to the door, a support means for a holder means and a holder means for an article, the insert means including an inverted V-shaped portion adapted for circumscribing the weatherstripping for unskewed mounting on said door, the support means extending generally curvilinearly outwardly then downwardly and inwardly from the insert means of interconnection means said at least one longitudinal column of interconnection means having a dimension with a transverse axis substantially greater than the vertical axis, the holder means having cooperatively connecting means for engagement with the interconnection means providing for selective adjustable upright positioning of said holder means.

21. The carrier according to claim 20 wherein the holder means defines a coin-tray-article container.

* * * * *